(12) United States Patent
Baert et al.

(10) Patent No.: US 11,647,695 B2
(45) Date of Patent: May 16, 2023

(54) CROP ELEVATOR AND COMBINE HARVESTER

(71) Applicant: CNH Industrial America LLC, New Holland, PA (US)

(72) Inventors: Matthias Baert, Assebroek (BE); Bart M. A. Missotten, Herent (BE); Eric Veikle, Lititz, PA (US); Denver R. Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 536 days.

(21) Appl. No.: 16/618,790

(22) PCT Filed: Mar. 12, 2018

(86) PCT No.: PCT/EP2018/056110
§ 371 (c)(1),
(2) Date: Dec. 2, 2019

(87) PCT Pub. No.: WO2018/219510
PCT Pub. Date: Dec. 6, 2018

(65) Prior Publication Data
US 2020/0084964 A1 Mar. 19, 2020

(30) Foreign Application Priority Data
Jun. 2, 2017 (BE) .................................. 2017/5398

(51) Int. Cl.
*A01F 12/46* (2006.01)
*A01F 12/50* (2006.01)
(Continued)

(52) U.S. Cl.
CPC .............. *A01F 12/46* (2013.01); *A01F 12/50* (2013.01); *G01G 11/003* (2013.01); *G01G 11/04* (2013.01);
(Continued)

(58) Field of Classification Search
CPC .......... A01F 12/46; A01F 12/50; A01F 11/00; G01G 21/22; G01G 21/24; G01G 11/003; G01G 11/04; G01G 19/12; G01G 11/00
See application file for complete search history.

(56) References Cited

U.S. PATENT DOCUMENTS 5,236,337 A * 8/1993 Kikuchi .................... B65B 1/46
177/52
5,685,772 A 11/1997 Anderson et al.
(Continued)

OTHER PUBLICATIONS

PCT International Search Report for PCT application PCT/EP2018/056110, dated Jul. 2, 2018 (13 pages).

*Primary Examiner* — Randy W Gibson
(74) *Attorney, Agent, or Firm* — Peter Zacharias

(57) ABSTRACT

A crop elevator for a combine harvester includes an ascending section and a descending section and a housing enclosing the ascending section and the descending section. The elevator further comprises an elevator loop arranged inside the housing which includes a plurality of paddles for elevating a harvested crop. The elevator also includes a weighing system configured to determine a weight of harvested crop that is present on at least one of the paddles during an ascending movement of the at least one of the paddles in the ascending section. The weighing system includes a weight sensor configured to output a weight signal representative of the weight of the harvested crop. The ascending section of the elevator comprises a measurement section, wherein the weighing system is configured to retrieve the weight signal when the at least one of the paddles is in the measurement section of the elevator.

15 Claims, 4 Drawing Sheets

(51) Int. Cl.
  *G01G 11/00* (2006.01)
  *G01G 19/12* (2006.01)
  *G01G 21/22* (2006.01)
  *G01G 21/24* (2006.01)
  *G01G 11/04* (2006.01)

(52) U.S. Cl.
  CPC ............ *G01G 19/12* (2013.01); *G01G 21/22* (2013.01); *G01G 21/24* (2013.01)

(56) References Cited

U.S. PATENT DOCUMENTS

| | | | |
|---|---|---|---|
| 5,740,843 A * | 4/1998 | Burkart | B65B 43/50 |
| | | | 141/168 |
| 5,800,262 A | 9/1998 | Andersen et al. | |
| 5,863,247 A | 1/1999 | Behnke et al. | |
| 5,890,961 A | 4/1999 | Behnke et al. | |
| 5,929,387 A * | 7/1999 | Inglin | G01G 15/00 |
| | | | 177/121 |
| 9,372,109 B2 | 6/2016 | Acheson et al. | |
| 2014/0262547 A1 | 9/2014 | Acheson et al. | |
| 2014/0262548 A1 | 9/2014 | Acheson et al. | |
| 2017/0074700 A1 | 3/2017 | Strnad et al. | |

* cited by examiner

CROP ELEVATOR AND COMBINE HARVESTER

FIELD OF THE INVENTION

The invention relates to the field of combine harvesters, and more specifically to crop elevators as applied in such harvesters.

BACKGROUND OF THE INVENTION

The present invention relates to the field of combine harvesters, as e.g. applied to harvest crops such as grain or the like. Typically, such an harvester comprises a header for harvesting a crop and a transport system for transporting the harvested crop to an on-board tank or to a grain cart or truck moving along with the harvester. Such a transport system may e.g. comprise an elevator having a lower inlet section for receiving a flow of harvested crop and an upper outlet section for outputting the flow of harvested crop. Typically, a yield sensor is provided near the outlet section, the yield sensor being used to indicate the amount of crop that is harvested. In principle, such a sensor can be calibrated when the amount of harvested crop that is harvested as measured by the yield sensor is compared with the actual amount of harvested crop, e.g. obtained by weighing the amount of harvested crop using a scale. In practice however, such an approach may be cumbersome, e.g. in case multiple harvesters supply harvested crop to a common grain cart or truck. It is therefore an objective of the present invention to provide in an alternative manner to calibrate a yield sensor of a combine harvester.

SUMMARY OF THE INVENTION

It would be desirable to provide in a combine harvester that is capable of more accurately determining a yield of the harvested crop. To better address this concern, in an aspect of the invention, there is provided a crop elevator for a harvester comprising:

an ascending section and a descending section;

a housing enclosing the ascending section and the descending section;

a elevator loop arranged inside the housing and comprising a plurality of paddles for elevating a harvested crop;

a weighing system configured to determine a weight of the harvested crop that is present on a measurement paddle of the plurality of paddles during an ascending movement of the measurement paddle in the ascending section, the weighing system comprising a weight sensor that is mechanically coupled to the measurement paddle and is configured to output a weight signal representative of the weight of the harvested crop;

wherein the ascending section comprises a measurement section, wherein the weighing system is configured to determine the weight signal when the measurement paddle is in the measurement section of the ascending section, and wherein a friction between the measurement paddle and the housing in the measurement section is lower than a friction between the measurement paddle and the housing outside the measurement section, during the ascending movement of the measurement paddle in the ascending section.

In accordance with the present invention, a crop elevator is provided for elevating a flow of harvested crop. The crop elevator comprising an elevator loop provided with a plurality of paddles that move through an ascending section and a descending section of the elevator. The ascending section and descending section being enclosed or surrounded by a housing.

In an embodiment, the crop elevator according to the present invention has an inlet section located near a bottom portion of the elevator loop and configured to receive a flow of harvested crop, and an outlet section located near a top portion of the elevator loop and configured to output the flow of harvested crop. In such embodiment, the flow of harvested crop as received by the inlet section is distributed over the paddles and transported upwards through the ascending section.

In accordance with the present invention, crop elevator further comprises a weighing system for weighing the amount of harvested crop on the paddles. Such a weighing system may e.g. comprise one or more weighing sensors configured to output a weight signal representative of the weight of the harvested crop that is provided on one or more paddles, referred to as measurement paddle or paddles, during the upward transport. It can be acknowledged that weighing sensors for weighing the harvested crop in crop elevators are known. However, known arrangements are deemed to provide in unreliable measurement results, due to the occurrence of friction between the measurement paddle or paddles and the elevator, i.e. the inner surface of the housing part surrounding the ascending section. In this respect it can be noted that, in order to avoid spillage of the harvested crop over the paddles, only a narrow gap can be allowed between the paddles and the housing. As a result, the paddles may occasionally contact the housing of the elevator, adversely affecting the reliability of the weighing results. In order to mitigate this effect, the crop elevator according to the present invention is provided with a measurement section, said measurement section being a part or portion of the ascending section of the elevator, whereby the weighing system is configured to retrieve the weight signal of the one or more weight sensors when the one or more measurement paddles are in the measurement section of the elevator. Further, in accordance with the present invention, friction reducing measures are taken to ensure that a friction between a measurement paddle or paddles and the housing in the measurement section is lower than a friction between the measurement paddle or paddles and the housing outside the measurement section. By doing so, a passage of the one or more measurement paddles through the measurement section may occur with a reduced friction, compared to a passage of said measurement paddle or paddles through the remaining part of the ascending section. As a result of this, a more accurate and reliable weighing of the harvested crop on the measurement paddle or paddles can be realized.

In an embodiment of the present invention, a cross-section of the measurement section is larger than a nominal cross-section of the ascending section. By doing so, a contacting between the paddles and the housing of the elevator during the weighing can be avoided. As this enlarged cross-section is only applied in the measurement section of the elevator, a spillage of the harvested crop via the gap between the paddles and the housing will remain comparatively small, so as to not affect the efficiency of the elevating process.

Alternatively, or in addition, other friction reducing measures that can be taken to ensure a more accurate weight measurement. Such measures may e.g. included the use of a dedicated coating, e.g. a low-friction coating such as Polytetrafluoroethylene (PTFE), in the measurement section, or the application of a bearing between the housing and the one or more paddles in the measurement section. As an example, an air bearing may be provided between the housing in the measurement section and a facing surface of the measurement paddle or paddles, to ensure that there is no contact between the housing and the measurement paddle or paddles during the weighing.

As yet another example of a friction reducing measure, the application of thinner housing or a housing of a different material may be applied in the measurement section, thereby providing an increased flexibility of the housing portion enclosing the measurement section and/or a larger gap between the housing and the paddles passing through.

In accordance with the present invention, the weighing system comprises one or more weight sensors for generating a weight signal representative of the weight of the harvested crop. As a first example of such sensors, the one or more paddles that are used for the weighing may e.g. be provided with force or pressure sensors, e.g. load cells, that are mounted on, or incorporated in, a top surface of the paddles.

As a second example, strain sensors, e.g. mounted to the belt or chain to which the paddles are connected, can be used to determine the weight of the one or more paddles and the harvested crop supported on them.

In an embodiment, the one or more weight signals of the one or more weight sensors may be provided to a processor of the weighing system, the processor being configured to receive the weight signal or signals and determine the weight of the harvested crop, based on the received weight signal or signals.

In an embodiment, the weighing system further comprises a proximity sensor configured to output a proximity signal representative of a position of the measurement paddle or paddles. Such a proximity sensor, e.g. an inductive or capacitive sensor, may be mounted at a bottom side of the measurement section. As such, the proximity sensor may be used to sense the arrival of the measurement paddle or paddles in the measurement section, thus indicating when to perform the processing of the weight signal or signals.

In an embodiment, the crop elevator according to the present invention may be applied in a combine harvester according to the present invention. Such a harvester may e.g. be equipped with a yield sensor configured to provide a yield signal representative of a flow of harvested crop as outputted by the crop elevator. In such an embodiment, the weight of the harvested crop on the measurement paddle or paddles as determined by the weighing system may be used to calibrate the yield sensor.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
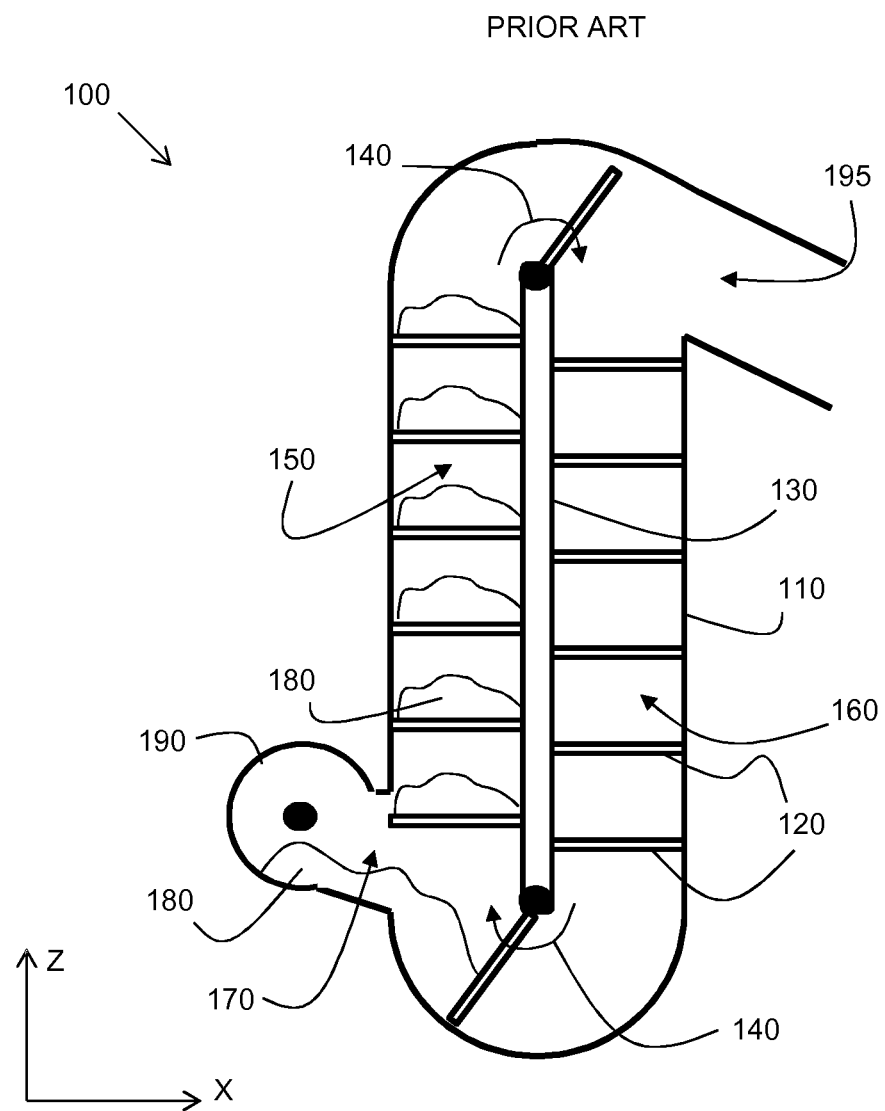
FIG. 1 depicts a cross-section of a crop elevator as know in the art.

FIG. 1 depicts a cross-section of a crop elevator 100 as known in the art. The crop elevator 100 comprises an elevator loop arranged inside a housing 110 of the crop elevator 100, the elevator loop comprising a plurality of paddles 120, mounted to a chain or belt 130 of the elevator loop. By driving the elevator loop as indicated by the arrows 140, the paddles on the left side, as seen in the view of FIG. 1, of the chain or belt 130 will move upward, while the paddles on the right side of the chain or belt 130 will move downward. The portion of the crop elevator where the paddles move upward is further on referred to as the ascending section 150 of the elevator 100, whereas the portion of the crop elevator where the paddles move downward is further on referred to as the descending section 160 of the elevator 100. The crop elevator 100 as shown further comprises an inlet section 170 configured to receive a flow of harvested crop 180, e.g. grain, said flow of crop 180 being received by the paddles 120 and transported upwards in the ascending section. In the arrangement as shown, the flow of harvested crop 180 is supplied to the inlet section 170 by means of an auger 190, the auger 190 extending in the Y-direction, perpendicular to the XZ-plane of the drawing. The crop elevator 100 as shown further comprises an outlet section 195 for outputting the flow of harvested crop 180 at an elevated level. It is known to apply a weighing system (not shown) in such an elevator, to determine the amount of harvested crop on the paddles in the ascending section. However, due to the application of a comparatively narrow gap between the paddles 120 and the housing 110, the weighing results as obtained in such an arrangement may not be accurate.

Figure 2:
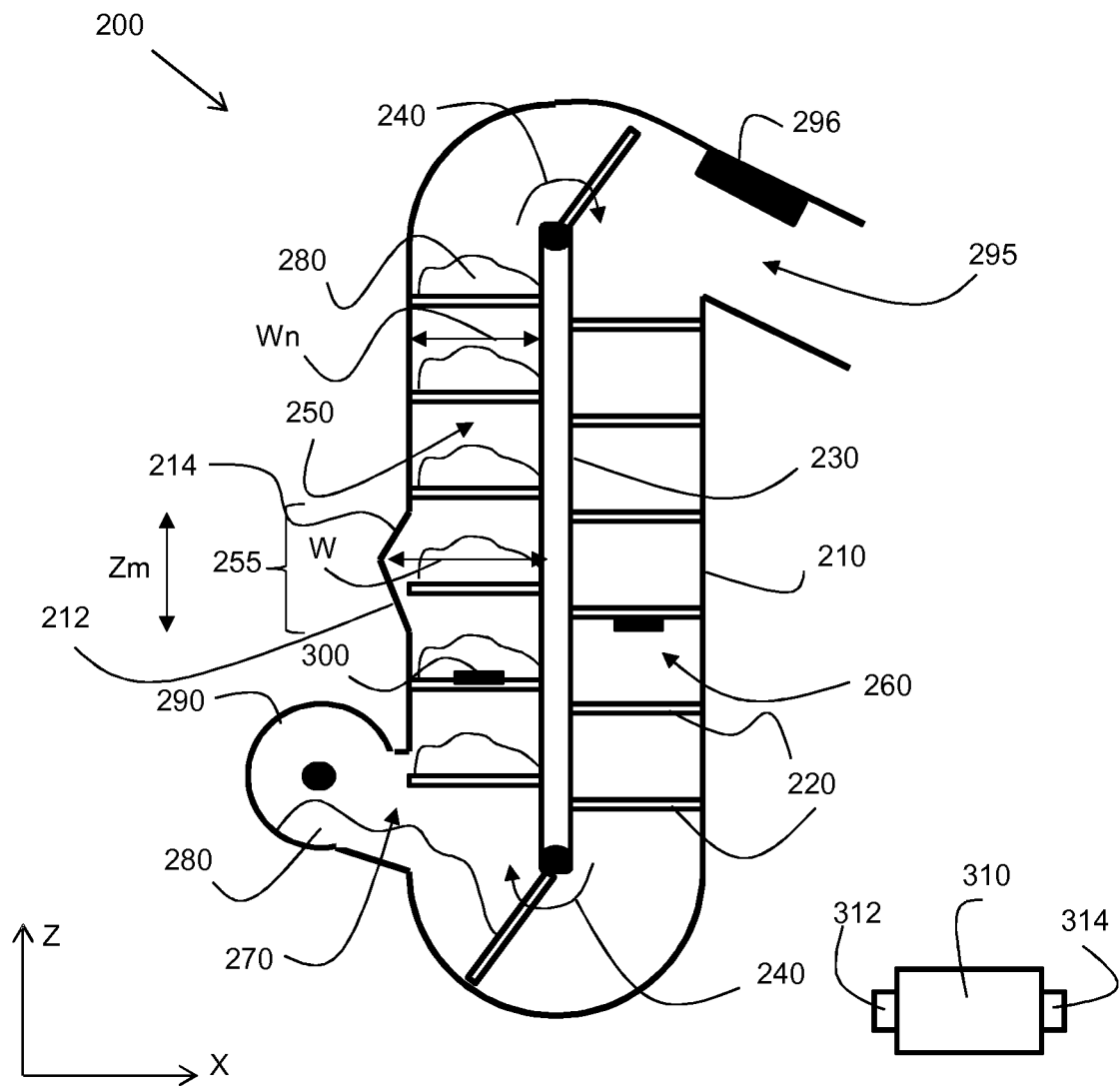
FIG. 2 depicts a cross-section of a crop elevator according to an embodiment of the present invention.

In order to improve the measurement accuracy of the weighing process, a modified crop elevator is therefore proposed. FIG. 2 schematically shows an crop elevator 200 according to a first embodiment according to the present invention. The crop elevator 200 comprises an elevator loop arranged inside a housing 210 of the crop elevator 200, the elevator loop comprising a plurality of paddles 220, mounted to a chain or belt 230 of the elevator loop. By driving the elevator loop as indicated by the arrows 240, the paddles on the left side of the chain or belt 130 will move upward, in the ascending section 250 of the elevator, while the paddles on the right side of the chain or belt 130 will move downward, in the descending section 260 of the elevator 20. In the embodiment as shown, the crop elevator 200 as shown further comprises an inlet section 270 configured to receive a flow of harvested crop 280, e.g. grain, said flow of crop 280 being received by the paddles 220 and transported upwards in the ascending section. In the embodiment as shown, the flow of harvested crop 280 is supplied to the inlet section 270 by means of an auger 290, the auger 290 extending in the Y-direction, perpendicular to the XZ-plane of the drawing. The crop elevator 200 as shown further comprises an outlet section 295 for outputting the flow of harvested crop 280 at an elevated level. In accordance with the present invention, the crop elevator 200 further comprises a weighing system configured to determine a weight of harvested crop 280 that is mounted on at least one of the paddles 220 during an ascending movement of the at least one of the paddles in the ascending section. In the embodiment as shown, the weighing system comprising a weight sensor 300 configured to output a weight signal representative of the weight of the harvested crop that is transported by one or more of the paddles. As an example, such a weight sensor 300 may e.g. comprise a load cell mounted to or incorporated in a top surface of a paddle of the plurality of paddles 220. Further, in accordance with the present invention, the weighing system is configured to perform the weighing process when the paddle or paddles that are to be weight are in a dedicated section of the ascending section of the elevator, the dedicated section being referred to as the measurement section 255 of the elevator 200. In accordance with the present invention, the measurement section 255 as applied in the crop elevator is configured such that a friction between a paddle passing through the measurement section, said paddle being referred to as a measurement paddle, and the housing is lower than a friction between the measurement paddle and the housing outside the measurement section, i.e. between the measurement paddle and the housing when the measurement paddle is ascending in the ascending section outside the measurement section. In accordance with the present invention, various friction reducing measures may be taken to enable a reduced friction passage of the measurement paddle or paddles through the measurement section 255 of the ascending section 250.

In the embodiment as shown, a cross-section of the housing portion of the housing enclosing the measurement section is larger than a nominal cross-section of the housing enclosing the ascending section. As can be seen, at the level of the measurement section 255, the width W of the ascending section is enlarged, compared to a nominal width Wn of the ascending section, outside the measurement section. The same enlargement or widening may be applied in the Y-direction as well. As a result, a measurement paddle arriving at the measurement section 255 will no longer be contacting the housing 210, due to the enlarged cross-section. This will enable the weighing system to provide a more accurate weighing of the paddle or paddles that are to be weighted.

In the embodiment as shown, the height Zm of the measurement section and the distance between two consecutive paddles of the paddles 220 is such that only one measurement paddle will be at the level of the measurement section at the same time. By enlarging the height Zm of the measurement section, one may however have more than one paddle in the measurement section, i.e. more than one measurement paddle, e.g. two or three. When each of the measurement paddles is provided with a sensor or, as will be explained in more detail below, a pair of strain sensors are used, the total weight of the measurement paddles may be determined.

In the embodiment as shown, the weighing system further comprises a processing system 310 configured to receive, at an input terminal 312, the weight signal of the one or more weight sensors 300 and configured to determine the weight of the harvested crop, based on the received weight signal. Such a processing system 310 may e.g. be embodied as a microprocessor, microcontroller, computer or the like. In an embodiment, the determined weight, and/or the received weight signals may e.g. be stored in a memory unit of the processing unit. In the embodiment as shown, the processing unit 310 further comprises an output terminal 314 for outputting a signal representative of the determined weight.

In the embodiment as shown, it can be seen that the housing portion of the measurement section 255 comprises a lower portion 212 having a width increasing from the nominal width Wn to the enlarged width W and an upper portion 214 having a width decreasing from the enlarged width W to the nominal width Wn. As will be understood, alternative manners to provide, in a dedicated section of a housing, an enlarged cross-section, may be devised as well.

In the embodiment as shown, the crop elevator 200 has an outlet section 295 for outputting the flow of harvested crop 280 at an elevated level. The crop elevator 200 further comprises a yield sensor 296, configured to output a yield signal, representative of the flow of crop that is outputted through the outlet section 295. Such a yield sensor may e.g. be a yield sensor as known in the art. Typically, a calibration of a yield sensor is required to ensure an accurate correspondence of the amount of harvested crop as determined based on measurements done by the yield sensor and a measurement of the amount of harvested crop using a scale at a farm where the harvested crop is collected.

In an embodiment of the present invention, a yield sensor 296 as applied in a crop elevator may be calibrated based on the weight signal of the weighing system, e.g. a weight signal obtained from the weight sensor 300.

Figure 3:
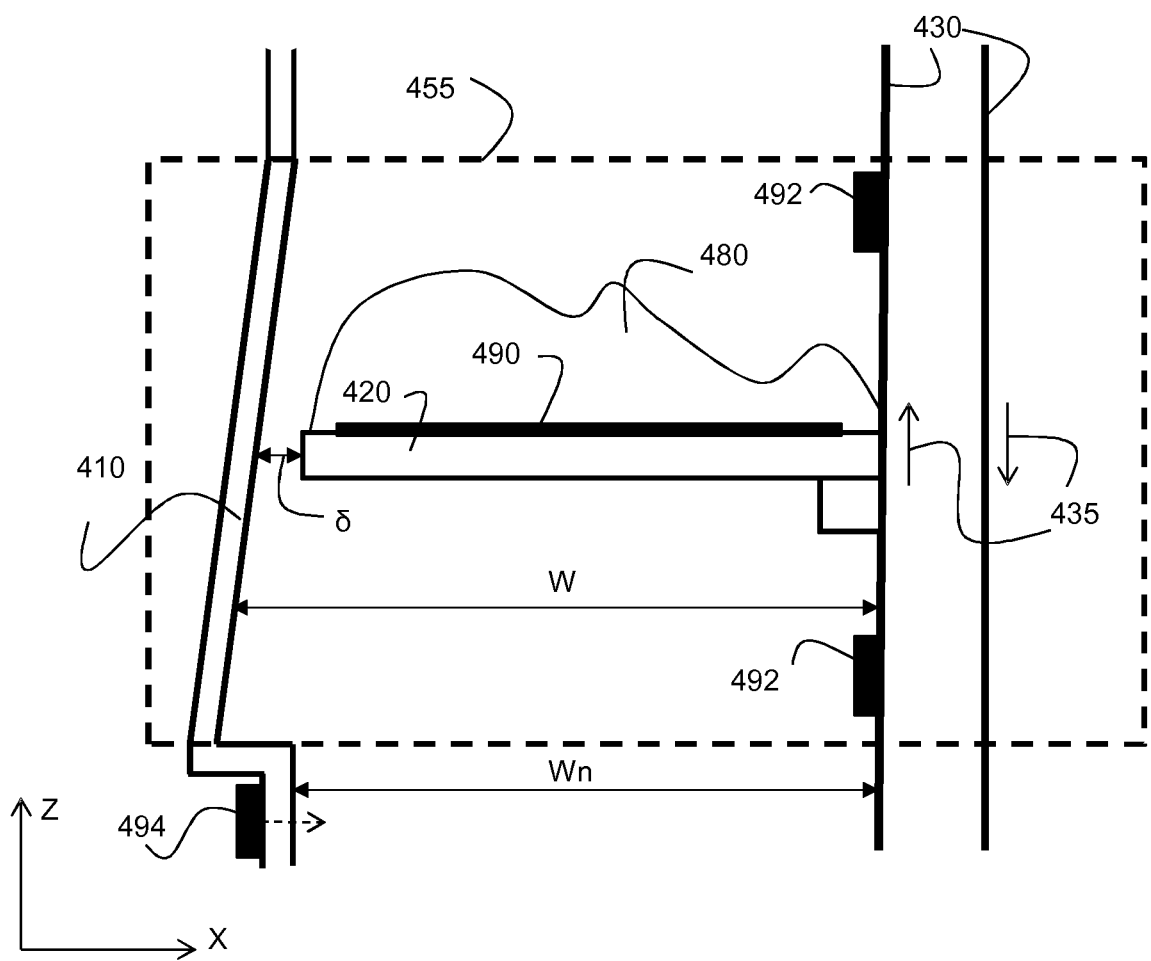
FIGS. 3 and 4 depict a detailed cross-sections of a measurement section of crop elevators according to embodiments of the present invention.

FIG. 3 schematically shows a more detailed cross-sectional view on a measurement section 455 of a crop elevator according to the present invention. FIG. 3 schematically shows part of an elevator loop 430, the movement of the elevator loop 430 being indicated by the arrows 435, and a measurement paddle 420, onto which an amount of harvested crop 480 is present, connected to the elevator loop 430. FIG. 3 further schematically shows part of the housing 410 of the crop elevator. As can be seen, in the embodiment as shown, the width Wn of the housing increases to an enlarged width W in the measurement section 455. As a result of the enlarged width of the housing, a gap δ between the measurement paddle 420 and the housing 410 is created. In the embodiment as shown, said gap is at its largest at the lower end of the measurement section 455 and gradually reduces going upward in the measurement section, until it substantially reduces to zero. By introducing the gap δ between the measurement paddle 420 and the housing 410, the friction between the measurement paddle 420 and the housing 410 is reduced, at least as long as the measurement paddle 420 is located inside the measurement section 455. As such, in accordance with the present invention, this passage through the measurement section 455 is used to determine the weight of the amount of harvested crop 480 on the measurement paddle 420. In order to weigh the amount of crop on the measurement paddle 420, the measurement paddle 420 may be equipped with a load cell or pressure sensor 490, such a load cell or pressure sensor thus being an example of a weight sensor as can be applied in a weight system of the crop elevator according to the present invention. An alternative to the application of a load cell mounted on or incorporated in a surface of the measurement paddle 420, a pair of strain sensors 492 may be applied to determine a weight of the harvested crop 280 on the measurement paddle 420. As can be seen, one strain sensor 492 of the pair of strain sensors 492 is mounted to the elevator loop 430 above the paddle 420 while the other strain sensor 492 of the pair of strain sensors 492 is mounted below the paddle. The difference between the measured strain by the sensors 492 can be considered to represent the weight of the elevator section between the sensors, plus the weight of the paddle, plus the weight of the harvested crop 480. By means of a factory calibration, the weight of the elevator section between the sensors, plus the weight of the paddle 420 may be determined in advance, and used to calculate the weight of the harvested crop 480 present on the paddle 420. Alternatively, or in addition, the weight of the elevator section between the sensors, plus the weight of the paddle 420 may also be determined during operation, in particular when the paddle 420 and sensors 492 are descending in the descending section of the elevator. Note however that in the descending section, the relative position in the vertical direction of the sensors is reversed. In such an arrangement, i.e. whereby the weight of the elevator section between the sensors, plus the weight of the paddle 420 is assessed during operation, it may be worth while to have a measurement section in the descending section as well, since the passage of the paddles through the descending section may suffer from friction as well.

FIG. 3 further schematically shows a proximity sensor 494 that is mounted to the housing 410 underneath the measurement section 455. Such a sensor 494, e.g. a capacitive, inductive or optical sensor, may generate a signal indicative of the presence of the measurement paddle 420. As such, in the embodiment as shown, such a signal may be indicate that the measurement paddle 420 is about to arrive in the measurement section 455 and that the weight measurement may start.

In the embodiment as shown, the measurement section 455, in particular the housing portion of the measurement section is wider than a housing portion below or above the measurement section. As will be understood, the same or similar widening may be applied in a direction perpendicular to the drawing, i.e. in the Y-direction perpendicular to the XZ-plane of the drawing, thereby further decreasing the friction between a paddle 420 that passes through the measurement section 455.

Figure 4:
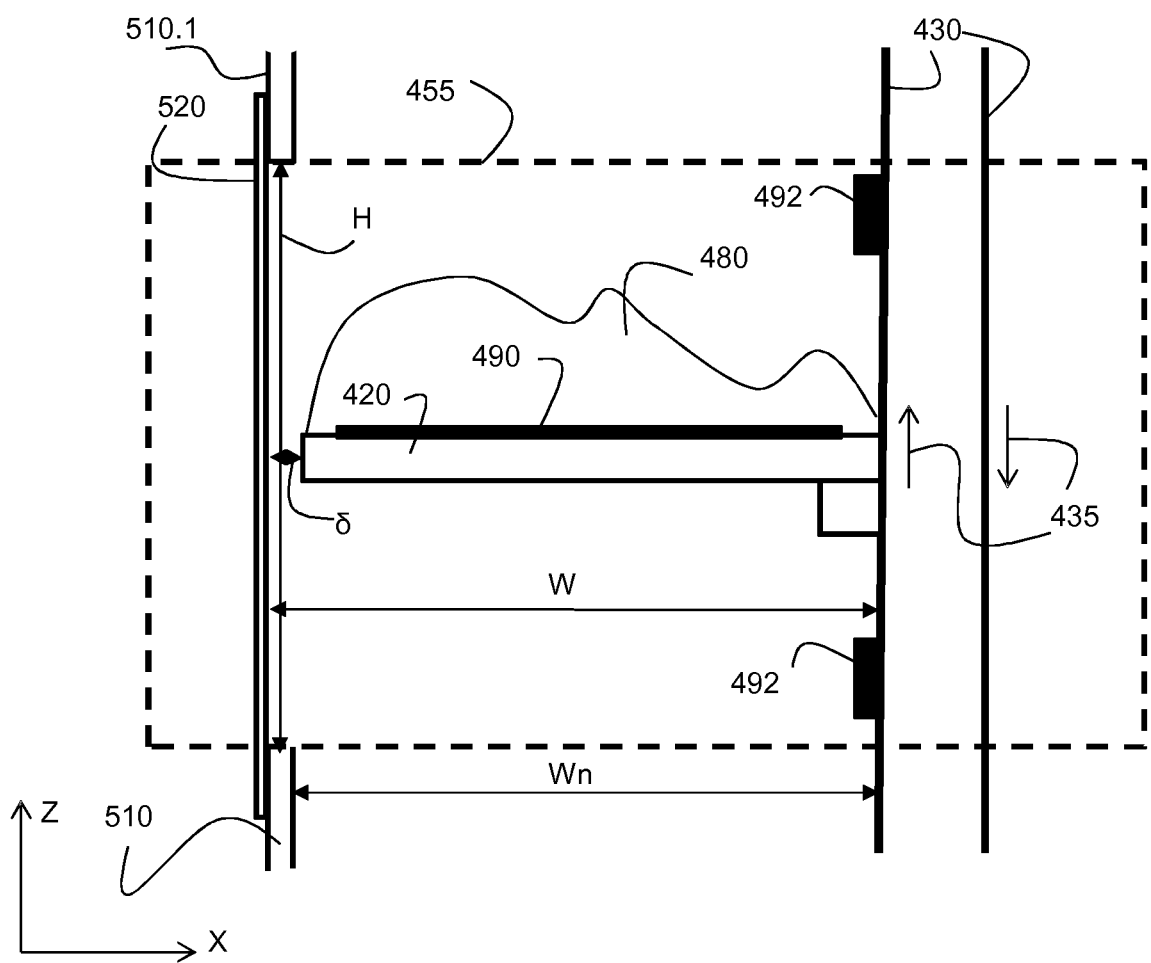

FIG. 4 schematically shows an alternative manner to reduce the friction between a measurement paddle 420 and a housing portion 510 of a housing of a crop elevator according to the present invention. FIG. 4 schematically shows, similar to FIG. 3, part of an elevator loop 430, the movement of the elevator loop 430 being indicated by the arrows 435, and a measurement paddle 420, onto which an amount of harvested crop 480 is present, connected to the elevator loop 430. FIG. 4 further schematically shows part of the housing 510 of the crop elevator, the housing portion 510 having an aperture with a height H corresponding to the height of the measurement section 455. In the embodiment as shown, the aperture is covered by a cover 520 that is mounted to an outer surface 510.1 of the housing. By doing so, the width Wn of the housing 510 increases to an enlarged width W in the measurement section 455. In the embodiment as shown, the width W corresponds to the width Wn+the thickness of the housing 510 in the X-direction. As a result of the enlarged width W in the measurement section 455, a gap δ between the measurement paddle 420 and the cover 520. As a result, a measurement paddle 420 passing through the measurement section 455 will experience a reduced friction.

In an embodiment of the present invention, the cover 520 as applied to cover the aperture of the housing can be made thinner than the housing and/or of a material that is more flexible than the material used for the housing. By doing so, the friction between the measurement paddle 420 and the cover 520 may be further reduced.

In an embodiment, rather than providing an aperture in the housing and covering it, the housing portion enclosing the measurement section can be made thinner than other parts of the housing. By doing so, the friction between the paddle passing through the measurement section and the housing may also be reduced.

The crop elevator according to the present invention enables, due to the use of a measurement section that has a reduced friction, a more accurate determination of the harvested crop that is transported upwards. This weighing result may e.g. be used, to calibrate a yield sensor that is typically applied on or near an outlet section of the harvester.

A further embodiment (not shown) comprises a crop elevator 100 with an ascending section 150 of constant cross section. The measurement paddle, comprising a weight sensor 300, is of reduced area with respect to the other paddles. The reduced area of this small paddle has an effect that the distance between the paddle and the housing is larger than with the other paddles 220 and therefore the friction between the measurement paddle and the housing 210 is lower than the friction between the other paddles 220 and the housing 210. At the measurement section the weight signal provided by the sensor 300 on the small paddle is determined resulting in a more accurate weight. As a further advantage, the proximity sensor 294 determining the location of the measurement section 255 can be positioned at any place along the length of the ascending section 150.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A crop elevator for a harvester comprising:
   an ascending section and a descending section;
   a housing enclosing the ascending section and the descending section;
   an elevator loop arranged inside the housing and comprising a plurality of paddles for elevating a harvested crop; and
   a weighing system configured to determine a weight of the harvested crop that is present on a measurement paddle of the plurality of paddles during an ascending movement of the measurement paddle in the ascending section, the weighing system comprising a weight sensor that is mechanically coupled to the measurement paddle and is configured to output a weight signal representative of the weight of the harvested crop,
   wherein the ascending section comprises a measurement section,
   wherein the weighing system is configured to determine the weight signal when the measurement paddle is in the measurement section of the ascending section, and
   wherein a friction between the measurement paddle and the housing in the measurement section is lower than a friction between paddles and the housing outside the measurement section, during the ascending movement of the measurement paddle in the ascending section.

2. The crop elevator according to claim 1, wherein a friction between the measurement paddle and the housing in the measurement section is lower than a friction between the measurement paddle and the housing outside the measurement section, during the ascending movement of the measurement paddle in the ascending section.

3. The crop elevator according to claim 2, wherein a cross-section of a housing portion of the housing enclosing the measurement section is larger than a nominal cross-section of the housing enclosing the ascending section or wherein a cross-section of a housing portion of the housing enclosing the measurement section is substantially the same as the nominal cross-section of the housing enclosing the ascending section and whereby the measurement paddle is of reduced area compared to other paddles.

4. The crop elevator according to claim 1, wherein a gap between the measurement paddle and the housing in the measurement section is larger than a gap between the measurement paddle and the housing in the ascending section outside the measurement section.

5. The crop elevator according to claim 1, wherein an inner surface of a housing portion of the housing enclosing the measurement section has a low-friction coating.

6. The crop elevator according to claim 1, wherein a housing portion of the housing enclosing the measurement section has a reduced thickness.

7. The crop elevator according to claim 1, wherein the weighing sensor comprises a load cell mounted to the measurement paddle.

8. The crop elevator according to claim 1, wherein the weight sensor comprises a strain sensor mounted to the elevator loop.

9. The crop elevator according to claim 1, wherein the weighing system further comprises a processor configured to receive the weight sensor signal and configured to determine the weight of the harvested crop, based on the received weight sensor signal.

10. The crop elevator according to claim 1, further comprising a proximity sensor configured to output a proximity signal representative of a position of the measurement paddle.

11. The crop elevator according to claim 1, further comprising:
   an inlet section located near a bottom portion of the elevator loop and configured to receive a flow of harvested crop; and
   an outlet section located near a top portion of the elevator loop and configured to output the flow of harvested crop.

12. The crop elevator according to claim 1, wherein the descending section comprises a further measurement section and wherein the weighing system is configured to determine a further weight signal when the measurement paddle is in the further measurement section.

13. A combine harvester comprising a crop elevator comprising:
   an ascending section and a descending section;
   a housing enclosing the ascending section and the descending section;
   an elevator loop arranged inside the housing and comprising a plurality of paddles for elevating a harvested crop; and
   a weighing system configured to determine a weight of the harvested crop that is present on a measurement paddle of the plurality of paddles during an ascending movement of the measurement paddle in the ascending section, the weighing system comprising a weight sensor that is mechanically coupled to the measurement paddle and is configured to output a weight signal representative of the weight of the harvested crop,
   wherein the ascending section comprises a measurement section,
   wherein the weighing system is configured to determine the weight signal when the measurement paddle is in the measurement section of the ascending section, and
   wherein a friction between the measurement paddle and the housing in the measurement section is lower than a friction between paddles and the housing outside the measurement section, during the ascending movement of the measurement paddle in the ascending section.

14. The combine harvester according to claim 13, further comprising a yield sensor mounted to an upper portion of the crop elevator and configured to output a yield signal representative of a flow of harvested crop as outputted by the crop elevator.

15. The combine harvester according to claim 14, wherein the weighing system is configured to receive the yield signal and determine a yield of the harvested crop, based on the yield signal and the weight signal.

* * * * *